United States Patent
Ming et al.

(10) Patent No.: US 11,485,422 B2
(45) Date of Patent: Nov. 1, 2022

(54) AERODYNAMIC MUD FLAP FOR MOTOR VEHICLE

(71) Applicant: HSMA, LLC, Brentwood, TN (US)

(72) Inventors: Darron Ming, Van Buren, AR (US); Asa Hazelwood, Nashville, TN (US); Eric Richard Larson, Spring Valley, OH (US); Kevin Paul Shatzer, Fairfield, OH (US); James Dow Smith, West Chester, OH (US)

(73) Assignee: HSMA, LLC, Brentwood, TN (US)

( * ) Notice: Subject to any disclaimer, the term of this patent is extended or adjusted under 35 U.S.C. 154(b) by 0 days.

(21) Appl. No.: 17/403,624

(22) Filed: Aug. 16, 2021

(65) Prior Publication Data

US 2022/0227427 A1 Jul. 21, 2022

Related U.S. Application Data

(63) Continuation of application No. 17/150,298, filed on Jan. 15, 2021, now Pat. No. 11,091,207.

(51) Int. Cl.
*B62D 35/00* (2006.01)
*B62D 25/16* (2006.01)
*B62D 25/18* (2006.01)

(52) U.S. Cl.
CPC ........... *B62D 25/18* (2013.01); *B62D 25/163* (2013.01); *B62D 35/001* (2013.01)

(58) Field of Classification Search
CPC ..... B62D 35/001; B62D 25/163; B62D 25/18
See application file for complete search history.

(56) References Cited

U.S. PATENT DOCUMENTS

| | | |
|---|---|---|
| 6,851,717 B1 | 2/2005 | Anderson |
| D904,951 S * | 12/2020 | Morgan, Jr .................. D12/185 |

(Continued)

FOREIGN PATENT DOCUMENTS

| | | |
|---|---|---|
| CN | 105283373 A | 1/2016 |
| JP | 2020117170 A | 6/2020 |

OTHER PUBLICATIONS

Michelin, Michelin Energy Guard Aerodynamic Solutions, accessible at https://business.michelinman.com/energyguard. Last accessed Apr. 15, 2021, 16 pages.

(Continued)

*Primary Examiner* — D Glenn Dayoan
*Assistant Examiner* — Melissa Ann Bonifazi
(74) *Attorney, Agent, or Firm* — Patterson Intellectual Property Law, PC; Jerry T. Sewell; Emily A. Shouse

(57) ABSTRACT

A mud flap for a wheeled vehicle includes an upper mounting portion and an extended protection portion. The extended protection portion includes at least two areas with slotted air flow openings. An upper slot area includes rows of elongated slots with the slots arranged in columns in each row. A lower slot area includes rows of elongated slots with the slots arranged in columns in each row. The slots in the upper slot area have heights that are greater than the heights of slots in the lower slot area. In some embodiments, a middle slot area is positioned between the upper slot area and the lower slot area. The slots in the middle slot area have different heights in different rows. In some embodiments, at least a portion of the slots in the upper slot area is replaced with diagonal mounting features.

20 Claims, 12 Drawing Sheets

(56) References Cited

U.S. PATENT DOCUMENTS

| | | | |
|---|---|---|---|
| 11,091,207 | B1 | 8/2021 | Ming et al. |
| 2003/0011188 | A1 | 1/2003 | Andersen |
| 2003/0141713 | A1* | 7/2003 | Morin ................. B62D 25/188 280/847 |
| 2011/0049858 | A1 | 3/2011 | Surti |
| 2013/0320658 | A1* | 12/2013 | Eklund ................. B62D 25/18 280/848 |

OTHER PUBLICATIONS

Fleet Engineers, AeroFlap Mud Flaps, dated Sep. 29, 2015, accessible at https://fleetengineers.s3.amazonaws.com/uploads/2015/10/84062_AeroFlapMudFlaps_092915.pdf, Last accessed Apr. 15, 2021, 2 pages.

PCT Search Report and Written Opinion for corresponding International application No. PCT/US2022/012421, dated Apr. 28, 2022, 10 pages.

\* cited by examiner

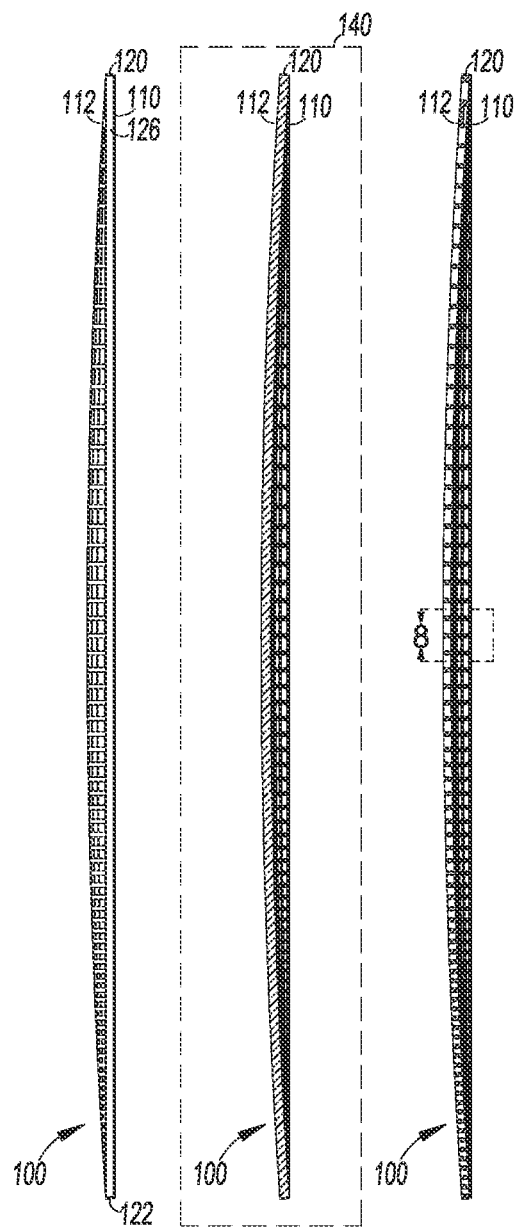
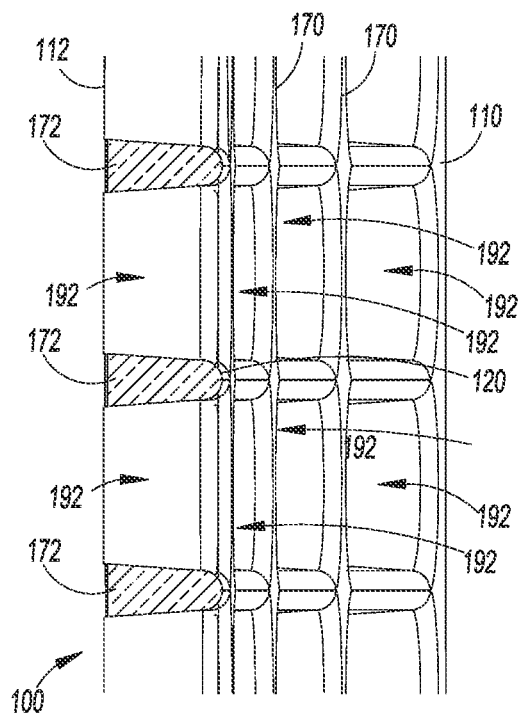
Fig. 5  Fig. 6  Fig. 7
Fig. 8

AERODYNAMIC MUD FLAP FOR MOTOR VEHICLE

RELATED APPLICATIONS

This application is a continuation of U.S. patent application Ser. No. 17/150,298 filed on Jan. 15, 2021, for "Aerodynamic Mud Flap for Motor Vehicle," which is incorporated by reference herein in its entirety.

FIELD OF THE DISCLOSED EMBODIMENTS

The subject matter of the present application is in the field of mud flaps for wheeled vehicles.

BACKGROUND OF THE DISCLOSED EMBODIMENTS

Mud flaps are devices that are positioned behind tires of wheeled vehicles to intercept water, mud, rocks and roadside debris picked up by the tires and to prevent at least a portion of the picked-up material from being ejected rearwardly into the path of following vehicles. Conventional mud flaps may comprise a generally rectangular sheet of solid material, such as rubber, and hang from a support structure at a level near the top of a tire. Such conventional mud flaps can be effective; however, the solid mud flaps also block air flow, which increases drag and decreases fuel economy. At high vehicle velocities, the force of the air and other material against the solid sheet causes the bottom of the mud flap to deflect rearwardly and upwardly, which leaves a lower portion of the tire unprotected by the mud flap such that a substantial portion of the water and other ejected material passes beneath the raised lower edge of the mud flap. The lack of air flow through the conventional solid mud flap allows the temperature of the tire to increase, which may result in premature tire failure. The solid structure of the conventional mud flap causes the mud flap to be heavy. Since a typical 18-wheel tractor-trailer rig may have 18 mud flaps, the combined weight of the solid mud flaps may decrease fuel economy and reduce the payload capacity of the vehicle.

Prior improvements to the structure of mud flaps have reduced some of the disadvantages of the conventional mud flaps. For example, U.S. Pat. No. 6,851,717 discloses a mud flap having a mesh panel comprising openings that reduce the solid surface area by approximately 75 percent. The openings in the mesh panel are sufficiently large to allow air to flow through the mesh panel but are sufficiently small to deflect a substantial portion of the water and other roadway debris.

SUMMARY

Although the prior improvements in the structures of mud flaps are beneficial, further reductions in weight of mud flaps may provide further increases in air flow through mud flaps and further decreases in deflection of the mud flaps at high vehicle velocities are desirable.

One aspect of the embodiments disclosed herein is a mud flap for a wheeled vehicle that includes an upper mounting portion and an extended protection portion. The extended protection portion includes at least two areas with slotted air flow openings. An upper slot area includes rows of elongated slots with the slots arranged in columns in each row. A lower slot area includes rows of elongated slots with the slots arranged in columns in each row. The slots in the upper slot area have heights that are greater than the heights of slots in the lower slot area. In some embodiments, a middle slot area is positioned between the upper slot area and the lower slot area. The slots in the middle slot area have different heights in different rows. In some embodiments, at least a portion of the slots in the upper slot area is replaced with diagonal mounting features.

Another aspect in accordance with embodiments disclosed herein is a mud flap configured to be installed behind a wheel of a wheeled vehicle. The mud flap comprises a flexible material. The flexible material has at least a concave front surface, a convex rear surface, an upper surface, a lower surface, a first side surface and a second side surface. The rear surface is spaced apart from the front surface by a thickness of the flexible material. The upper surface is spaced apart from the lower surface by a height of the flexible material. The first side surface is spaced apart from the second side surface by a width of the flexible material. A plurality of mounting openings are formed through the flexible material from the front surface to the rear surface. The first plurality of mounting openings are located in a mounting band proximate to the upper surface. A first set of air flow openings are formed through the flexible material from the front surface to the rear surface. The first set of air flow openings are arranged in vertical columns and arranged in a first plurality of horizontal rows. Each opening in the first set of air flow openings has a first vertical height. The first set of air flow openings are located in an upper air flow band below the mounting band. A second set of air flow openings are formed through the flexible material from the front surface to the rear surface. The second set of air flow openings are arranged in the vertical columns and are arranged in a second plurality of rows. Each opening in the second set of air flow openings has a second vertical height. The second vertical height is less than the first vertical height. The second set of air flow openings are located in a lower air flow band immediately above the lower surface. In some embodiments in accordance with this aspect, at least a portion of the upper air flow area includes a diagonal mounting area with mounting openings oriented at approximately 45 degrees to the upper surface of the mud flap.

Another aspect in accordance with embodiments disclosed herein is a mud flap configured to be installed behind a wheel of a wheeled vehicle. The mud flap comprises a flexible material. The flexible material has at least a concave front surface, a convex rear surface, an upper surface, a lower surface, a first side surface and a second side surface. The rear surface is spaced apart from the front surface by a thickness of the flexible material. The upper surface is spaced apart from the lower surface by a height of the flexible material. The first side surface is spaced apart from the second side surface by a width of the flexible material. A plurality of mounting openings are formed through the flexible material from the front surface to the rear surface. The first plurality of mounting openings are located in a mounting band proximate to the upper surface. A first set of air flow openings are formed through the flexible material from the front surface to the rear surface. The first set of air flow openings are arranged in vertical columns and arranged in a first plurality of horizontal rows. Each opening in the first set of air flow openings has a first vertical height. The first set of air flow openings are located in an upper air flow band below the mounting band. A second set of air flow openings are formed through the flexible material from the front surface to the rear surface. The second set of air flow openings are arranged in the vertical columns and are arranged in a second plurality of rows. Each opening in the second set of air flow openings has a second vertical height. The second vertical height is less than the first vertical height. The second set of air flow openings are located in a lower air flow band immediately above the lower surface. A third set of air flow openings are formed through the flexible material from the front surface to the rear surface. The third set of air flow openings are arranged in the vertical columns in a third plurality of rows. The third set of air flow openings are located between the first set of openings and the second set of openings. The openings in the third set of openings having varying heights. Each opening in an uppermost row of the third plurality of rows has a greatest third set height. Each opening in a lowermost row of the third plurality of rows has a least third set height. Each opening in at least one row of the third plurality of rows between the uppermost row and the lowermost row has a height between the greatest third set height and the least third set height. In some embodiments in accordance with this aspect, at least a portion of the upper air flow area includes a diagonal mounting area with mounting openings oriented at approximately 45 degrees to the upper surface of the mud flap.

BRIEF DESCRIPTIONS OF THE DRAWINGS

The foregoing aspects and other aspects of the disclosure are described in detail below in connection with the accompanying drawings in which:

FIG. 5 illustrates a right side elevational view of the mud flap of FIG. 1;

FIG. 6 illustrates a right side cross-sectional elevational view of the mud flap of FIG. 1 taken along the line 6-6 in FIG. 3;

FIG. 7 illustrates a right side cross-sectional elevational view of the mud flap of FIG. 1 taken along the line 7-7 in FIG. 3;

FIG. 8 illustrates an enlarged cross-sectional view of the mud flap of FIG. 1 taken within the area —8— of FIG. 7;

Figure 14:
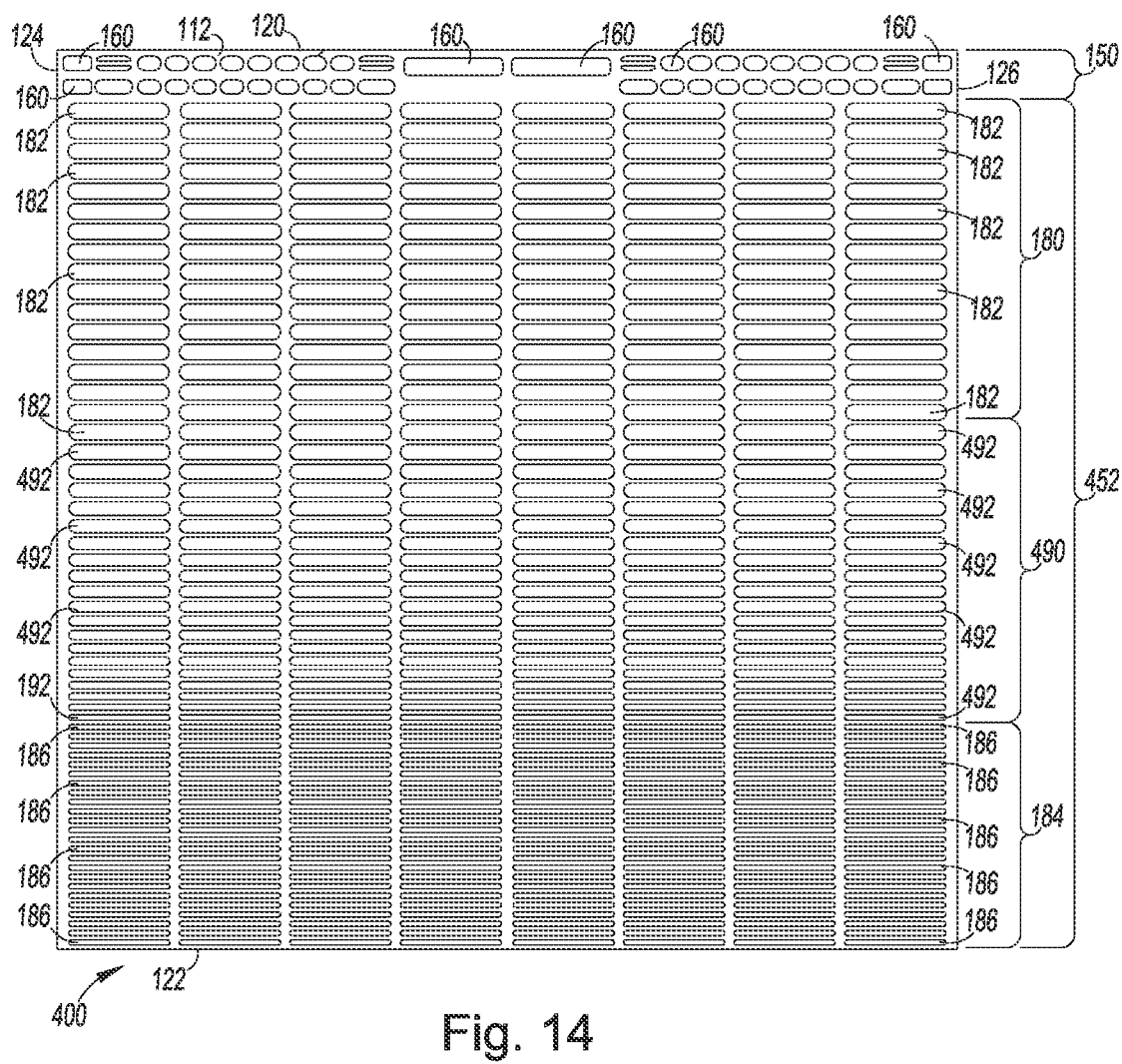
FIG. 14 illustrates a rear elevational view of a third embodiment of the mud flap wherein the mud flap of FIG. 14 is shorter (in the vertical direction) than the mud flap of FIG. 13.
Figure 17:
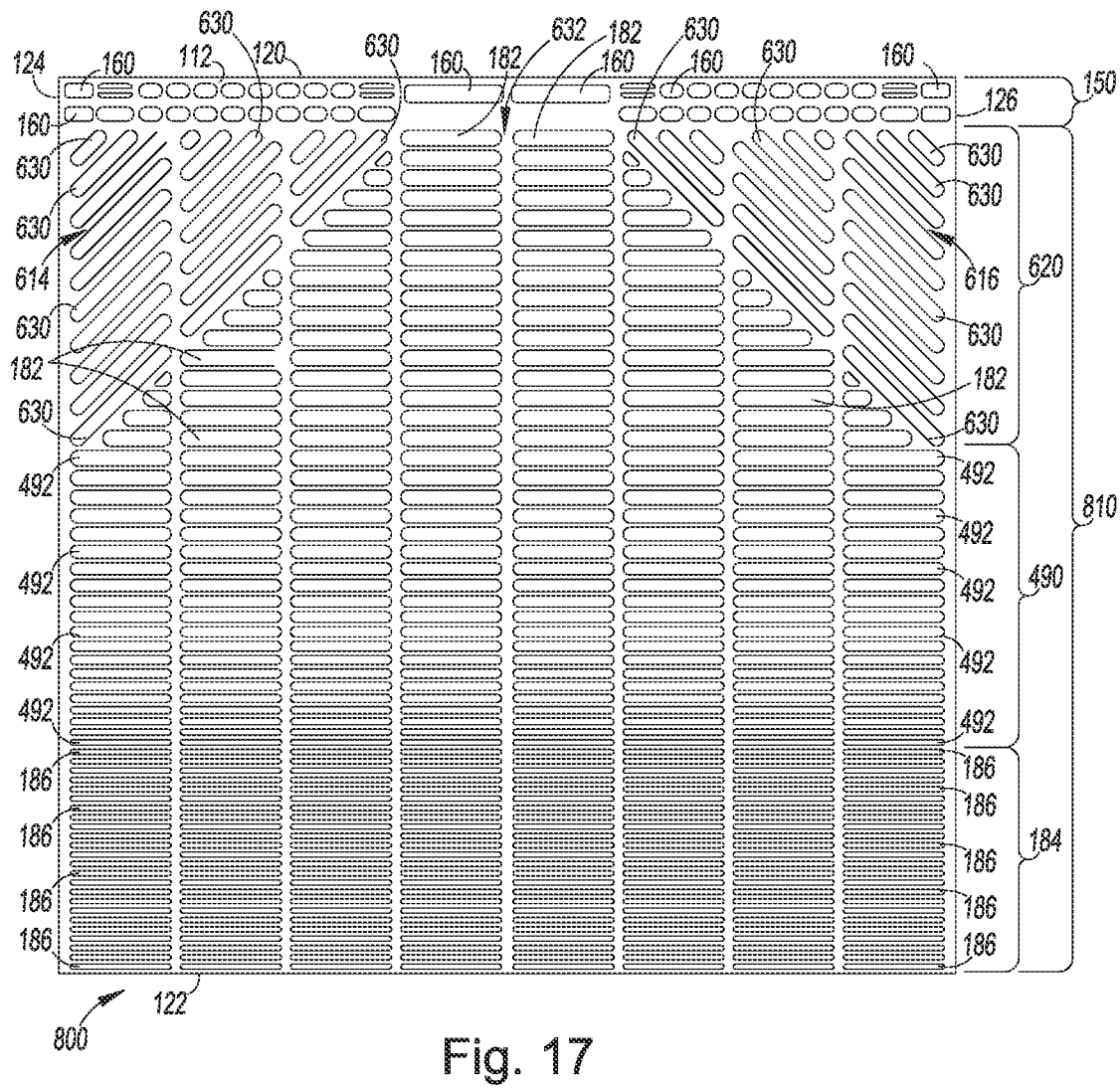
Figure 18:
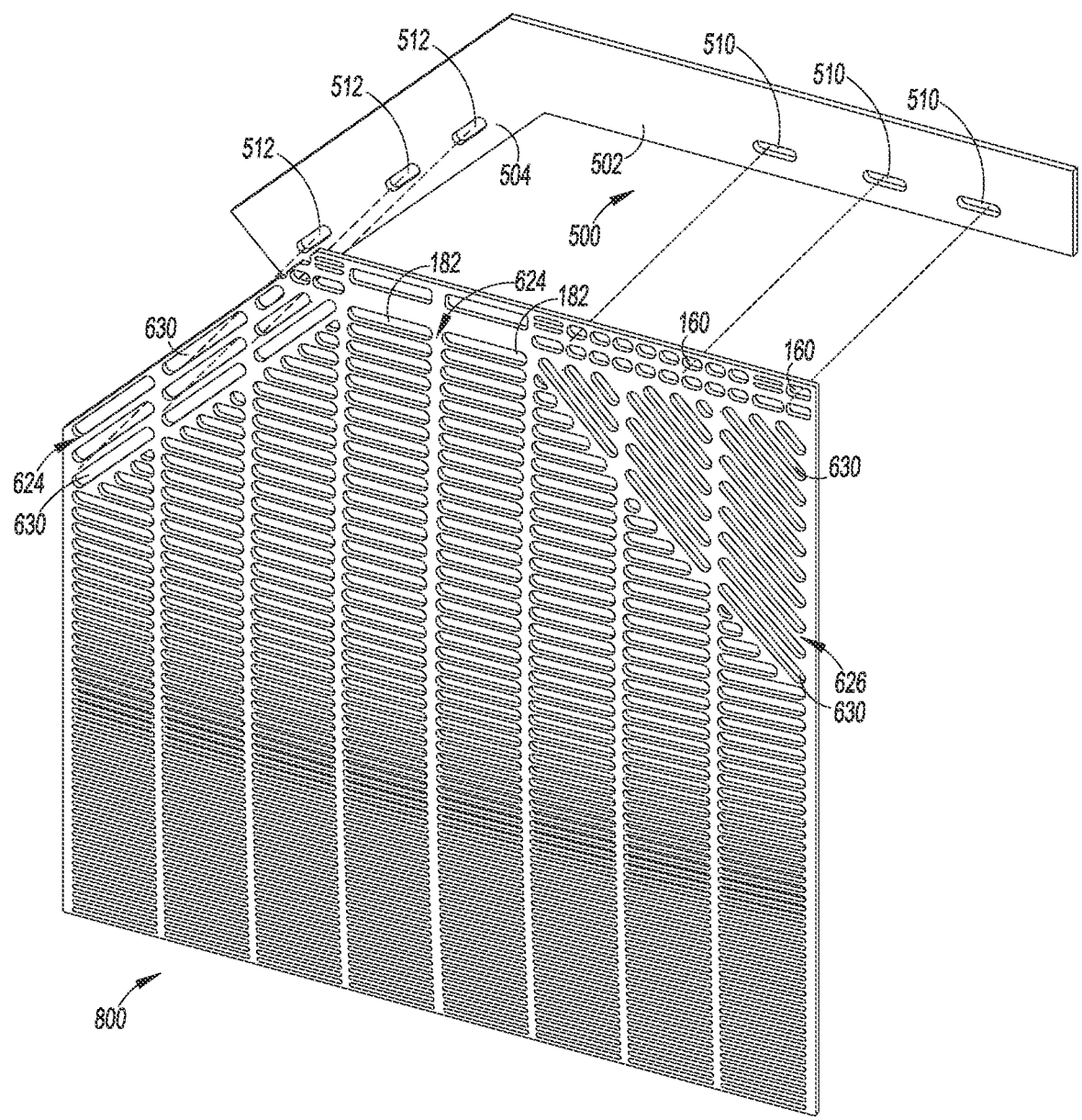

FIG. 17 illustrates a rear elevational view of a sixth embodiment of the mud flap, which is modified from the mud flap of FIG. 14, wherein the mud flap of FIG. 17 further includes a first (left) area of diagonal mounting openings and a second (right) area of diagonal mounting structures; and FIG. 18 illustrates a rear elevational view of the mud flap of FIG. 17 with a portion of the first (left) area of diagonal mounting openings cut away to configure the mud flap for mounting on a doglegged mounting bracket.

DESCRIPTION OF ILLUSTRATED EMBODIMENTS

As used throughout this specification, the words "upper," "lower," "longitudinal," "upward," "downward," "proximal," "distal," and other similar directional words are used with respect to the views being described.

FIGS. 1-12 illustrates a first embodiment of a mud flap 100 in accordance with the improvements disclosed herein. For the purposes of the following description, the mud flap of FIGS. 1-12 may be referred to as a 24×30 mud flap, which refers to the approximately outer dimensions of the illustrated mud flap as 24 inches in width by 30 inches in height. As used herein, the width of the mud flap is in a horizontal direction and the height is in a vertical direction as viewed when the mud flap is installed on wheeled vehicle. The dimensions are provided for illustration only and are not intended to be limiting except as may be used in the claims appended hereto.

Figure 1:
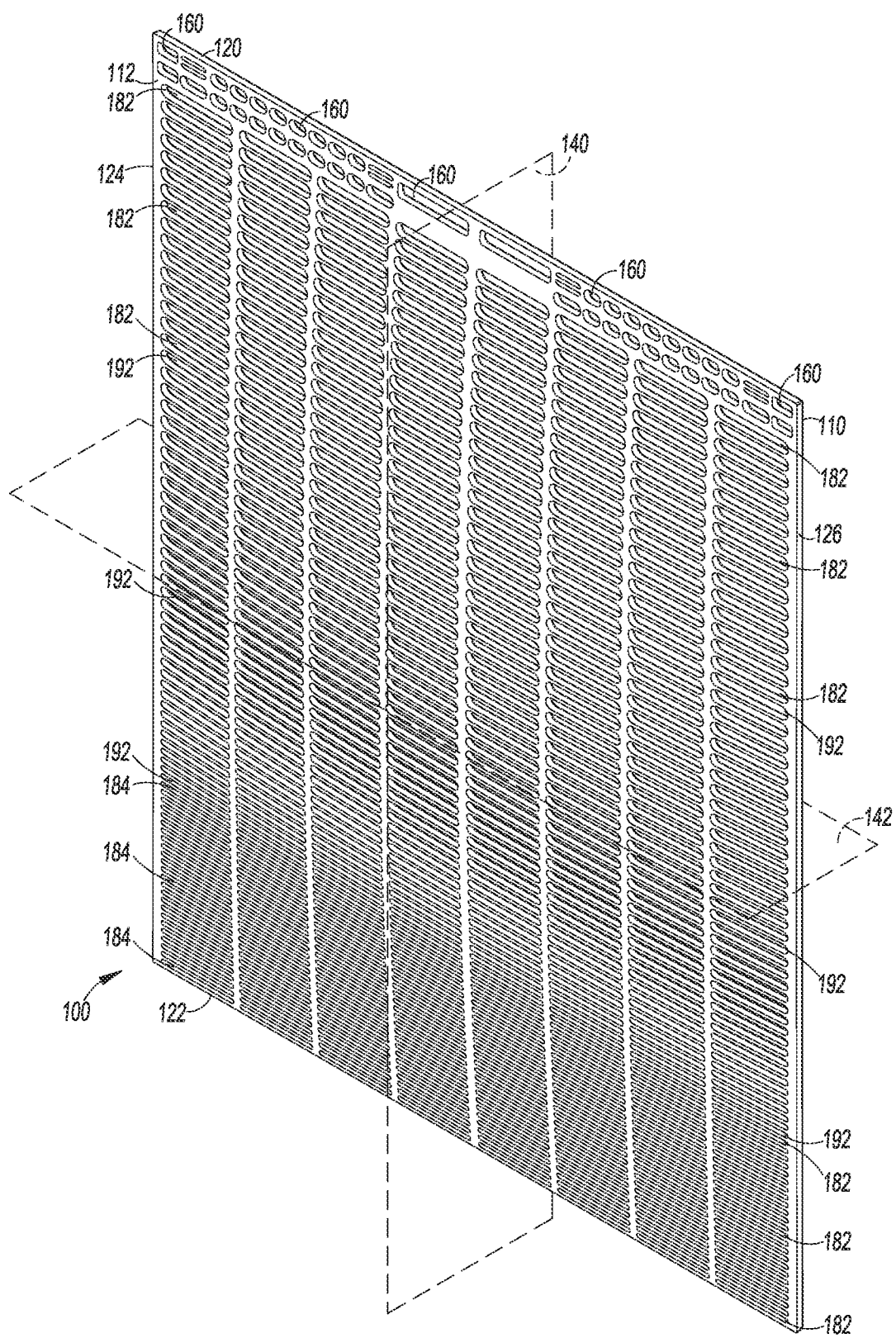
FIG. 1 illustrates a rear perspective view of an exemplary embodiment of a mud flap according to aspects of the present disclosure.

FIG. 1 illustrates a rear perspective view of the mud flap 100 configured for installation behind a tire (not shown) of wheeled vehicle (not shown). A "wheeled vehicle" may be the tractor of a tractor-trailer combination, the trailer of a tractor-trailer combination, a commercial vehicle, a personal truck, an automobile, or any other vehicle onto which a mud flap may be installed. For ease of understanding of the structure and operation of the mud flap disclosed herein, the "front" of the mud flap faces the tire of the wheeled vehicle and thus faces toward the front of the wheeled vehicle onto which the mud flap is mounted. The rear surface of the mud flap is the surface seen by a person in a vehicle following the wheeled vehicle; and the rear view is disclosed herein as the primary view of the mud flap. The "front" surface of the mud flap faces towards the tire behind which the mud flap is installed. As further disclosed herein, the "left" side the mud flap is the side facing the left side of the motor vehicle, which is often referred to as the driver's side for vehicles in the United States. The "right" side of the mud flap is the side facing the right side of the motor vehicle, which is often referred to as the passenger side for vehicles in the United States. Such directional indications are for reference in understanding the orientations of the illustrated embodiments and are not intended to be limiting.

Figure 2:
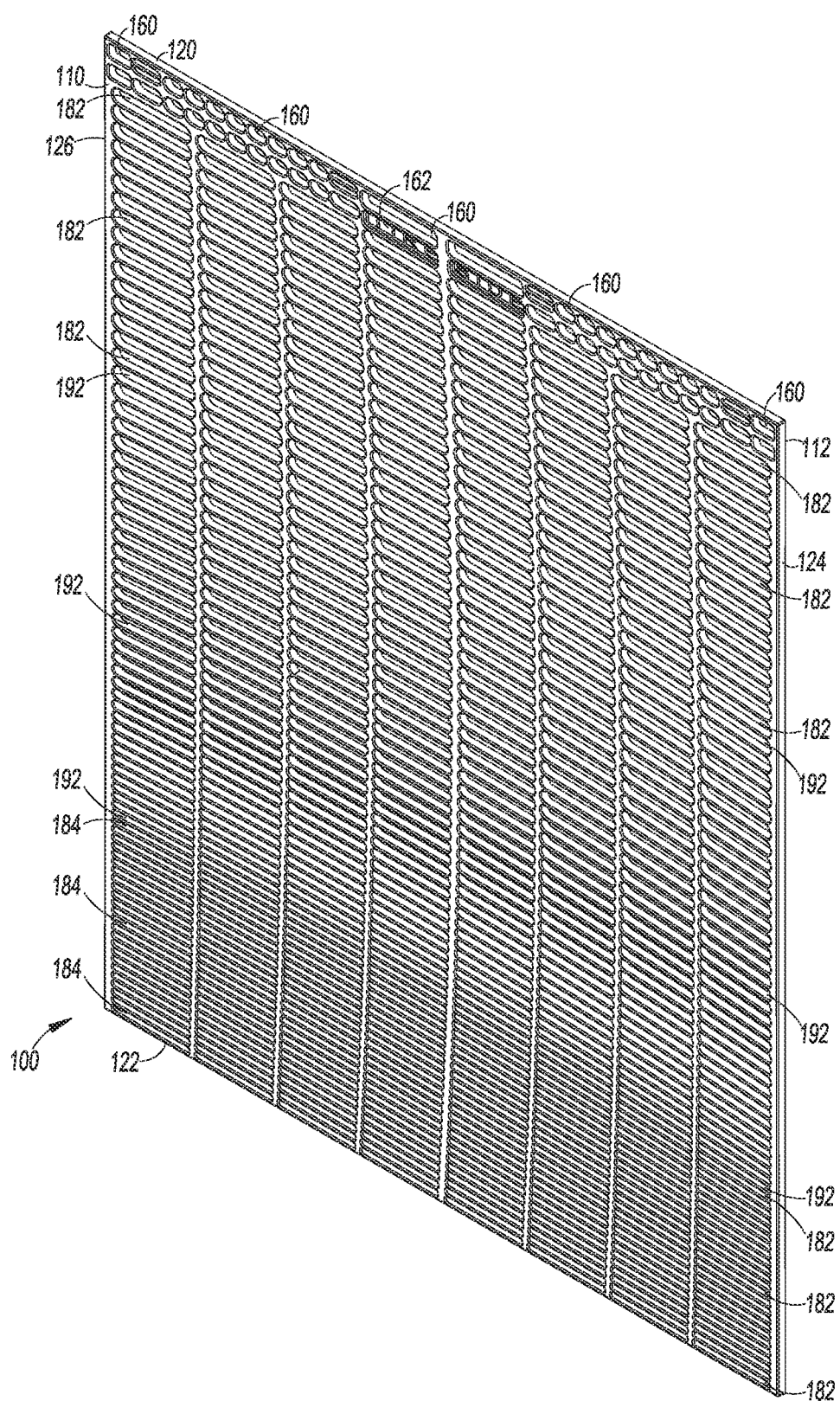
FIG. 2 illustrates a front perspective view of the mud flap of FIG. 1.
Figure 3:
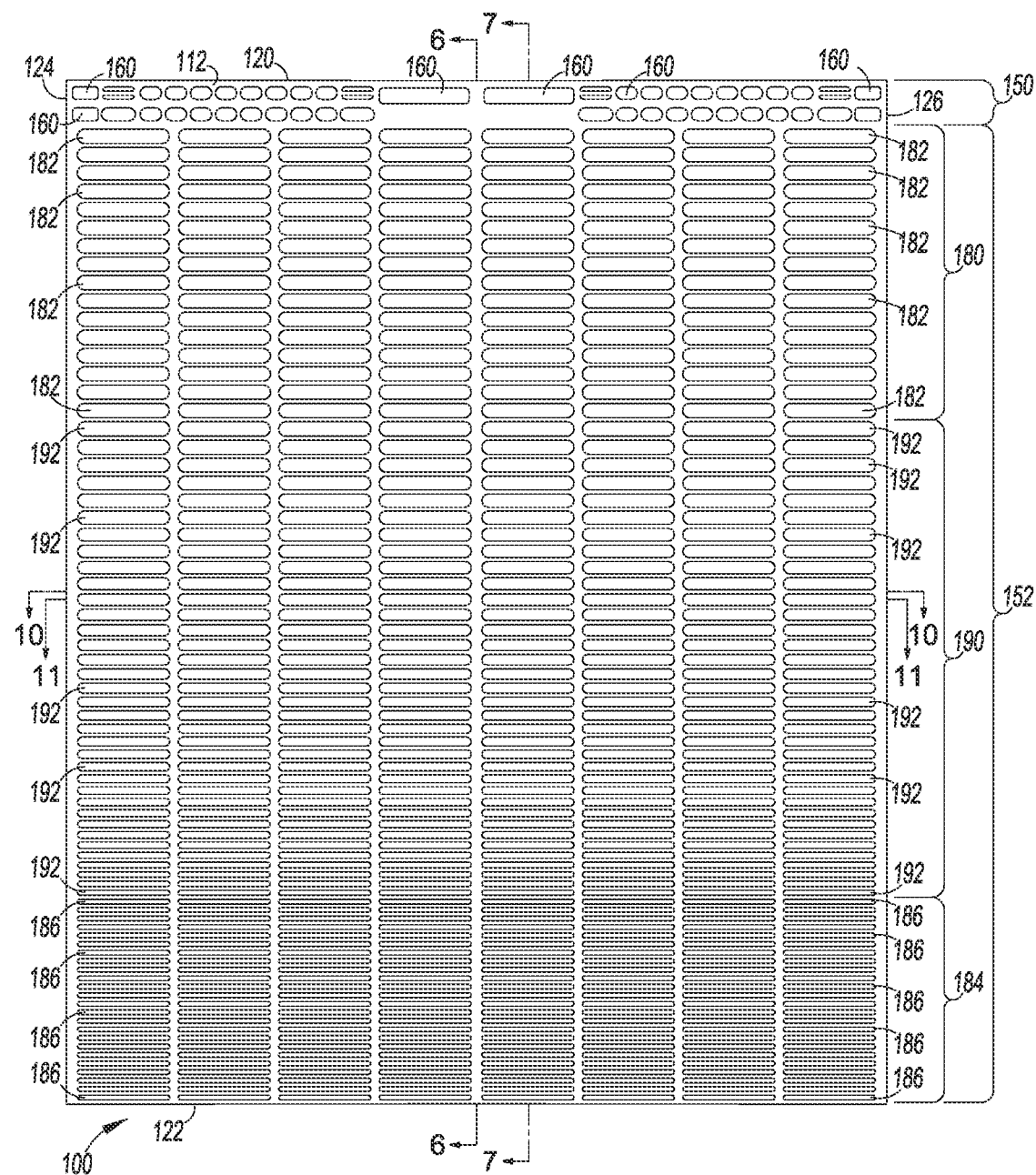
FIG. 3 illustrates a rear elevational view of the mud flap of FIG. 1.
Figure 4:
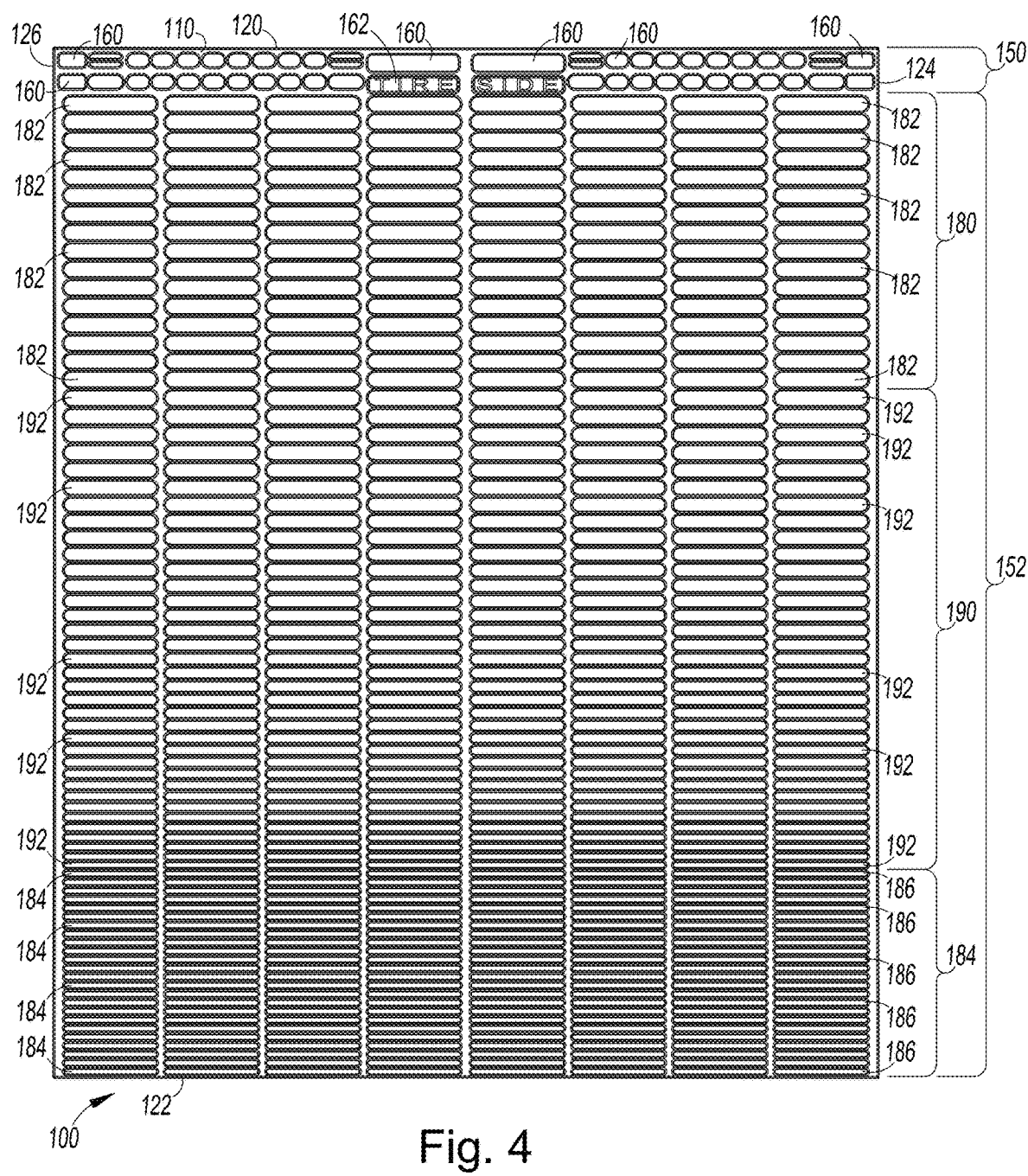
FIG. 4 illustrates a front elevational view of the mud flap of FIG. 1.
Figure 9:
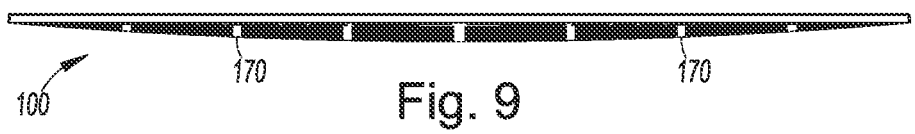
FIG. 9 illustrates a top plan view of the mud flap of FIG. 1.
Figure 10:
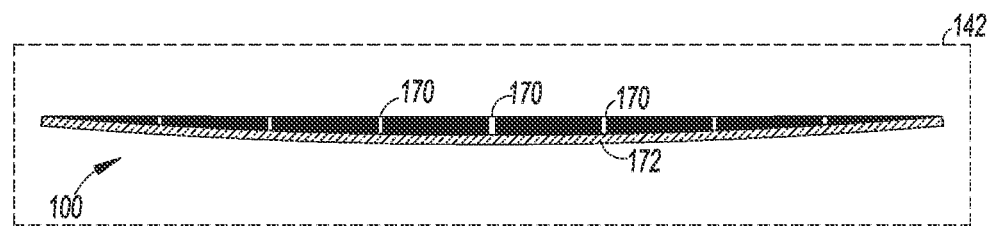
FIG. 10 illustrates a top cross-sectional plan view of the mud flap of FIG. 1 taken along the line 10-10 in FIG. 3.
Figure 11:
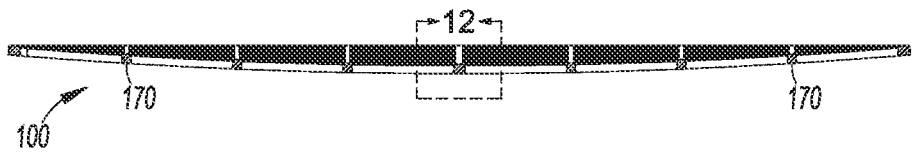
FIG. 11 illustrates a top cross-sectional plan view of the mud flap of FIG. 1 taken along the line 11-11 in FIG. 3.
Figure 12:
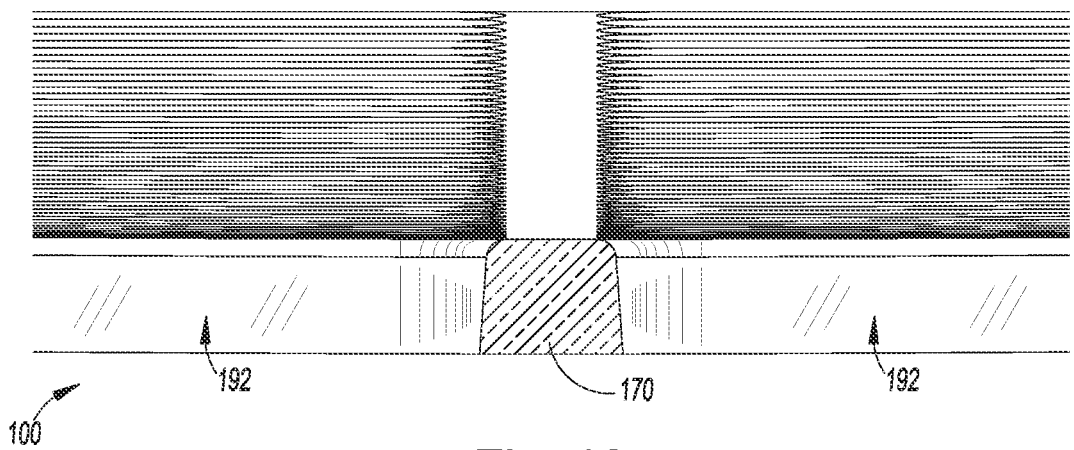
FIG. 12 illustrates an enlarged cross-sectional view of the mud flap of FIG. 1 taken within the area —12— of FIG. 11.

FIG. 2 illustrates a front perspective view of the mud flap. FIG. 3 illustrates a rear elevational view of the mud flap of FIG. 1. FIG. 4 illustrates a front elevational view of the mud flap of FIG. 1. FIG. 5 illustrates a right side elevational view of the mud flap of FIG. 1. FIG. 6 illustrates a cross-sectional elevational view of the mud flap of FIG. 1 taken along the line 6-6 in FIG. 3. FIG. 7 illustrates a cross-sectional elevational view of the mud flap of FIG. 1 taken along the line 7-7 in FIG. 3. FIG. 8 illustrates an enlarged cross-sectional view of the mud flap of FIG. 1 taken within the area —8— of FIG. 7. FIG. 9 illustrates a top plan view of the mud flap of FIG. 1. FIG. 10 illustrates a cross-sectional plan view of the mud flap of FIG. 1 taken along the line 10-10 in FIG. 3. FIG. 11 illustrates a cross-sectional plan view of the mud flap of FIG. 1 taken along the line 11-11 in FIG. 3. FIG. 12 illustrates an enlarged cross-sectional view of the mud flap of FIG. 1 taken within the area —12— of FIG. 11.

The mud flap 100 includes a front surface 110 and a rear surface 112. The front and rear surfaces are defined between an upper surface 120, a lower surface 122, a left surface 124 and a right surface 126. As discussed above, the left surface is defined as shown on the left in the views of FIGS. 1 and 3, and the right surface is defined as shown on the right in the views of FIGS. 1 and 3. For reasons discussed above, the front surface of the mud flap may also be referred to as the "tire side" of the mud flap.

In the illustrated embodiment, at least a portion of the mud flap 100 comprises a strong, pliable material such as nylon. The material may be molded to form the size and shape shown in FIGS. 1-12. In the illustrated embodiment, the material has a thickness of approximately 0.25 inch (approximately 6.3 millimeters) between the front surface 110 and the rear surface 112. In the illustrated embodiment of FIGS. 1-12, each of the front surface and the rear surface has a width between the left surface 124 and the right surface 126 of approximately 24 inches (approximately 61 centimeters) and has a height between the lower surface 122 and the upper surface 120 of approximately 30 inches (approximately 76 centimeters). As previously noted, although specific measurements are provided as examples, such examples and sizes are not intended to be limiting unless as set forth in the claims.

The front surface 110 and the rear surface 112 of the mud flap 100 may be planar in other embodiments; however, in the illustrated embodiment, the front surface is convex and the rear surface is concave. These curved surface features may be seen more clearly in the right elevational views of FIGS. 5-7 and in the top plan views of FIGS. 9-11.

As shown in FIGS. 5-7 and in FIGS. 9-11, the rear surface 112 of the mud flap 100 may bow outwardly (towards the rear) such that the middle of the rear surface is displaced approximately 0.5 inch (approximately 12.7 millimeters) from the edges of the rear surface where the rear surface intersects the upper surface 120, the lower surface 122, the left surface 124 and the right surface 126. The front (tire side) surface 110 is displaced inwardly by a like distance. As shown in the embodiment illustrated by FIG. 6, the bowing of the two surfaces results in the rear surface having a radius of approximately 226 inches (approximately 574 centimeters) in a vertical midplane 140 defined through the horizontal center of the mud flap. As shown in FIG. 10, the rear surface has a radius of approximately 144 inches (approximately 365 centimeters) in a horizontal midplane 142 defined through the vertical center of the mud flap. The bowing of the mud flap provides an anti-sail characteristic by increasing the stiffness of the mud flap. The anti-sail characteristic of the mud flap inhibits the tendency of a mud flap to sail upwardly away from the road surface at higher vehicle velocities. Thus, higher-velocity material ejected from the lower portion of the tire continues to be blocked by the mud flap at higher vehicle velocities. The concave front of the mud flap also captures water and debris and effectively causes the water and debris intercepted by the lower portion of the mud flap to migrate upward to the upper larger slots where the water and small debris that passes through the upper larger slots at a lower velocity than the velocity at which the water and debris is ejected from the treads of the tire.

In the illustrated embodiment, the upper surface 120 and the lower surface 122 are substantially planar and have dimensions of approximately 24 inches (approximately 61 centimeters) by approximately 0.25 inch (approximately 6.3 millimeters). In the illustrated embodiment, the left surface 124 and the right surface 126 are substantially planar and have dimensions of approximately 30 inches (approximately 76 centimeters) by approximately 0.25 inch (approximately 6.3 millimeters). In some embodiments, the upper surface, the lower surface, the left surface and the right surface may be slightly bowed because of the bowing of the front surface 110 and the rear surface 120. In the illustrated embodiment, the upper surface, the lower surface, the left surface and the right surface are drafted inwardly at an angle of approximately 4 degrees from the rear surface 112 to the front surface 110.

As illustrated in FIG. 3, the mud flap 100 includes an upper mounting portion (or mounting band) 150 and a lower extended portion (or air flow band) 152. The lower extended portion may also be referred to as the protection portion, which at least partially blocks water and debris to protect vehicles following the wheeled vehicle onto which the mud flap is installed. The upper mounting portion comprises a band of material having a width that extends across the top of the mud flap and having a height of approximately 1.3 inches (approximately 3.3 centimeters) with respect to the upper surface 120 of the mud flap. The upper mounting portion includes a plurality of elongated openings 160 that extend through the material of the mud flap from the front surface 110 to the rear surface 112. In the illustrated embodiment, the openings in the upper mounting portion comprise two rows of openings having various sizes and shapes. The openings in the upper mounting portion have at least two purposes. Mounting bolts or screws (not shown) may be positioned through selected openings to engage a mounting bracket (not shown) positioned near a tire (not shown) of a wheeled vehicle (not shown) to secure the mud flap to the mounting bracket. The many positions of the openings allow the mud flap to be secured to many different configurations of brackets having varying mounting hole positions. The plurality of openings also reduce the amount of the material used for the mud flap, thus decreasing the cost of the material used to produce the mud flap and decreasing the weight of the mud flap that must be transported by the vehicle onto which the mud flap is installed.

As further shown in FIGS. 1 and 3, a center portion 162 of the second row of the mounting portion 150 of the mud flap 100 includes embossed lettering on the front surface 110. The lettering may optionally comprise the characters "TIRE SIDE" to indicate to an installer (not shown) that the front surface of the mud flap should be positioned towards the tire (not shown) of the wheeled vehicle (not shown) onto which the mud flap is installed.

The lower extended portion (air flow portion) 152 of the mud flap 100 is the portion that extends below the upper mounting portion 150 and thus extends behind the tire of the wheeled vehicle onto which the mud flap is installed. The lower extended portion includes a plurality of slotted air flow openings (described below) that are positioned in eight vertical columns that extend from just below the upper mounting portion 150 to just above the lower surface 122 of the mud flap. The columns are defined by seven spaced-apart vertical ribs 170 that extend along the width of the lower extended portion of the mud flap parallel to the left surface 124 and the right surface 126 of the mud flap. The ribs extend through the material of the mud flap between the front surface 110 and the rear surface 112. Each of the vertical ribs has a width on the rear surface of approximately 0.312 inch (approximately 7.9 millimeters). As show in FIG. 12, each rib tapers to a width of approximately 0.282 inch (approximately 7.2 millimeters) near the front surface. Each rib further includes a fillet having a radius of approximately 0.042 inch (approximately 1 millimeter) at the front surface. The narrow tapered and filleted vertical ribs provide strength to the mud flap while reducing aerodynamic drag in the direction of air flow when the wheeled vehicle is moving forward. The number of ribs and the number of columns defined by the ribs may be varied in other embodiments. Eight columns defined by seven ribs has been found to be a suitable compromise between material stiffness and air flow through the mud flap.

In the illustrated embodiment, each air flow opening is configured as an oval-shaped slot between a pair of horizontal vanes 172, which are shown in an enlarged view in FIG. 8. Each horizontal vane has a width on the rear surface 112 of the mud flap 100 of approximately 0.115 inch (approximately 2.9 millimeters). Each vane tapers to a width of approximately 0.085 inch (approximately 2.16 millimeters) near the front surface of the mud flap. Each vane has fillets with radiuses of approximately 0.039 inch (approximately 1 millimeter) with respect to the front surface to provide a rounded "nose" for the vane at the front surface. The narrow tapered vanes with the rounded noses reduces the aerodynamic drag caused by air flowing through the openings and reduces splashing of water incident on the noses of the vanes.

The air flow openings defined by the vertical ribs 170 and the horizontal vanes 172 form a plurality of slots (identified below) wherein each slot has two horizontal sides that are spaced apart to form a generally rectangular opening. Each slot has a semicircular end portion at each end to complete the oval shape. Other shapes for the slots may be used; however, the oval-shaped slots have been found to provide the aerodynamic benefits described below.

The lower extended portion 152 includes at least two areas of slots. An upper slot area (or upper slot band) 180 comprises a first plurality of slots 182 having a first (largest) size. A lower slot area (or lower slot band) 184 comprises a second plurality of slots 186 having a second (smallest) size. In the illustrated embodiment, the lower extended portion includes a third slot area (or lower slot band) 190 comprising a third plurality of slots 192 having varying sizes between the first size and the second size. As discussed above, the slots in each of the three slot areas are organized in a plurality (e.g., eight) vertical columns.

In the upper slot area 180, each upper slot 182 has an overall width (in the horizontal direction) of approximately 2.695 inches (approximately 65 millimeters) and a height (in the vertical direction of approximately 0.421 inch (approximately 10.7 millimeters). Each slot in the upper slot area comprises a rectangular portion having a width of approximately 2.274 inch (approximately 57.7 millimeters) with a semicircle at each end with a radius of approximately 0.21 inch (approximately 5.3 millimeters). Thus, each slot in the upper slot area has an area of approximately 1.096 square inches (approximately 707 square millimeters). The area is sufficient to allow water to pass through; however, the slots are sufficiently small to block all but the smallest of solid debris. Larger debris falls from the mud flap back to the pavement.

The lower side of a slot in the upper slot area is spaced apart from the upper side of the next lower slot in the upper slot area by the vanes 172, which have a vertical height of approximately 0.115 inch (approximately 2.9 millimeters), which causes the upper slots to have a center-to-center spacing of 0.536 inch (approximately 13.6 millimeters). The upper slot area 180 comprises sixteen rows of the slots 182 of the first size over a height of approximately 8.58 inches (approximately 218 millimeters). The upper slot area comprises 128 slots of the first size. Since each slot has an area of approximately 1.096 square inches (approximately 707 square millimeters), the total area of the slot openings in the upper slot area is approximately 140.36 square inches (approximately 89,216 square millimeters). The overall area of the upper slot area is approximately 205.8 square inches (approximately 132,789 square millimeters). Thus, the slots comprise approximately 68 percent of the surface area of the upper slot area.

In the lower slot area 184, each slot 186 has the same overall width as the slots 182 in the upper slot area 180. Each slot 186 in the lower slot area has a height of approximately 0.135 inch (approximately 3.43 millimeters). Each slot in the lower slot area comprises a rectangular portion having a width of approximately 2.56 inch (approximately 65 millimeters) with a semicircle at each end with a radius of approximately 0.0625 inch (approximately 1.6 millimeters). Thus, each slot in the lower slot area has an area of approximately 0.36 square inches (approximately 232 square millimeters).

Each of the slots 186 in the lower slot area 184 is spaced apart by approximately 0.115 inch (approximately 2.9 millimeters) as in the upper slot area 180; however, since the slots in the lower slot area have a shorter vertical height, the slots in the lower slot area have a center-to-center vertical spacing of approximately 0.25 inch (approximately 6.35 millimeters).

The lower slot area 184 comprises twenty-four rows of slots 186, which results in 192 slots in the lower slot area over a height of approximately 6 inches (approximately 152.4 millimeters). Thus, the total area of the slot openings in the lower slot area is approximately 69.1 square inches (approximately 44,582 square millimeters). The total area of the lower slot are is approximately 144 square inches (approximately 92,903 square millimeters). Thus, the openings comprise approximately 48 percent of the lower slot area.

In the illustrated embodiment, the middle slot area 190 comprising the third plurality of slots 192 is positioned between the upper slot area 180 and the lower slot area 184. Unlike the slots 182 in the upper slot area and the slots 186 in the lower slot area, the slots 192 in the middle slot area not all the same size. Instead, the middle slot area comprises a plurality of rows wherein the heights of the slots in each row decrease with each subsequent lower row in the middle slot are. In the illustrated embodiment, the slots in the uppermost row of the middle slot area have a height of approximately 0.427 inch (approximately 10.8 millimeters), which is slightly greater than the height (0.421 inch) of the slots in the lowermost row of the upper slot area. This slight increase of approximately 1.4 percent in the height allows the 0.115-inch spacing between rows of slots to be maintained throughout the three slot areas. The slots in the second row of the middle slot area have a height of approximately 0.418 inch (approximately 10.6 millimeters). The slots in each subsequently lower row in the middle slot area have shorter heights in the following order in rows two through thirty-five: 0.410 inch; 0.402 inch; 0.393 inch; 0.385 inch;

0.377 inch; 0.368 inch; 0.360 inch; 0.352 inch; 0.343 inch; 0.335 inch; 0.327 inch; 0.318 inch; 0.310 inch; 0.302 inch; 0.293 inch; 0.285 inch; 0.277 inch; 0.268 inch; 0.260 inch; 0.252 inch; 0.243 inch; 0.238 inch; 0.227 inch; 0.218 inch; 0.210 inch; 0.202 inch; 0.192 inch; 0.185 inch; 0.177 inch; 0.168 inch; 0.160 inch; 0.152 inch; 0.143 inch. In summary, the middle slot area has a total of 35 rows of slots with slot heights varying from 0.427 inch to 0.143 inch. The heights of the slots in the uppermost row of the middle slot area are approximately 1.5 percent greater than the heights of the slots in the upper slot area. The heights of the slots in the lowermost row of the middle slot area are approximately 6 percent greater than the heights of the slots in the lower slot area.

In alternative embodiments, the heights of the slots may be decreased in a different pattern. For example, a first set of multiple rows within the middle slot portion may have slots of the same heights before decreasing to a smaller height in s second set of multiple rows. The continual decrease of the slot heights on a row-by-row basis in the middle slot area provides a highly functional and aesthetically pleasing transition the heights of the slots between the upper slot area and the lower slot area.

The upper slot area 180, the lower slot area 184 and the middle slot area 190 have different characteristics.

The constant sized large slots 182 in the upper slot area 180 cause the upper slot area to have relatively large area of openings compared to the overall area (e.g., approximately 68 percent of openings versus approximately 32 percent of closed material). Thus, the upper slot area has a substantially reduced aerodynamic drag and a substantially reduced weight per unit area. The relatively larger slots in the upper slot area allow water to pass through but block larger debris such as gravel and mud clumps. Although water passes through the large slots of upper slot area, the water is incident on the upper slot area at greater angles with respect to the forward motion of the vehicle on which the mud flap is attached. Thus, the rearward velocity of water passing through slots in the upper slot area is less than the rearward velocity of water ejected toward the lower slot area 184.

The constant sized small slots 186 in the lower slot area 184 are located in the lowermost section (e.g., six inches) of the mud flap 100 where water and other debris impact the mud flap more directly (e.g., at a smaller angle from the treads of the tires). The smaller slots block more water and debris while allowing air to flow through the tightly spaced slots. The higher ratio of material to openings (e.g., approximately 52 percent material to approximately 48 percent openings) causes the lower portion of the mud flap to be stiffer and therefore causes the lower portion of the mud flap to deflect less in response to the greater impact force of the water and air hitting the mud flap at the lower ejection angles from the tires.

The slots 192 in the middle slot area 190 provide a gradual transition from the shorter heights of the small slots 186 in the lower slot are 184 to the greater heights of the large slots 182 in the upper slot area 180 such that the slots in the middle slot area gradually allow more water and debris to flow through as the horizontal velocities of the water and debris reduce at farther distances from the pavement. The gradual transition in the heights of the slots also provides a more aesthetically pleasing appearance to the mud flap than would be provided by an abrupt changes in the heights of the slots.

Figure 13:
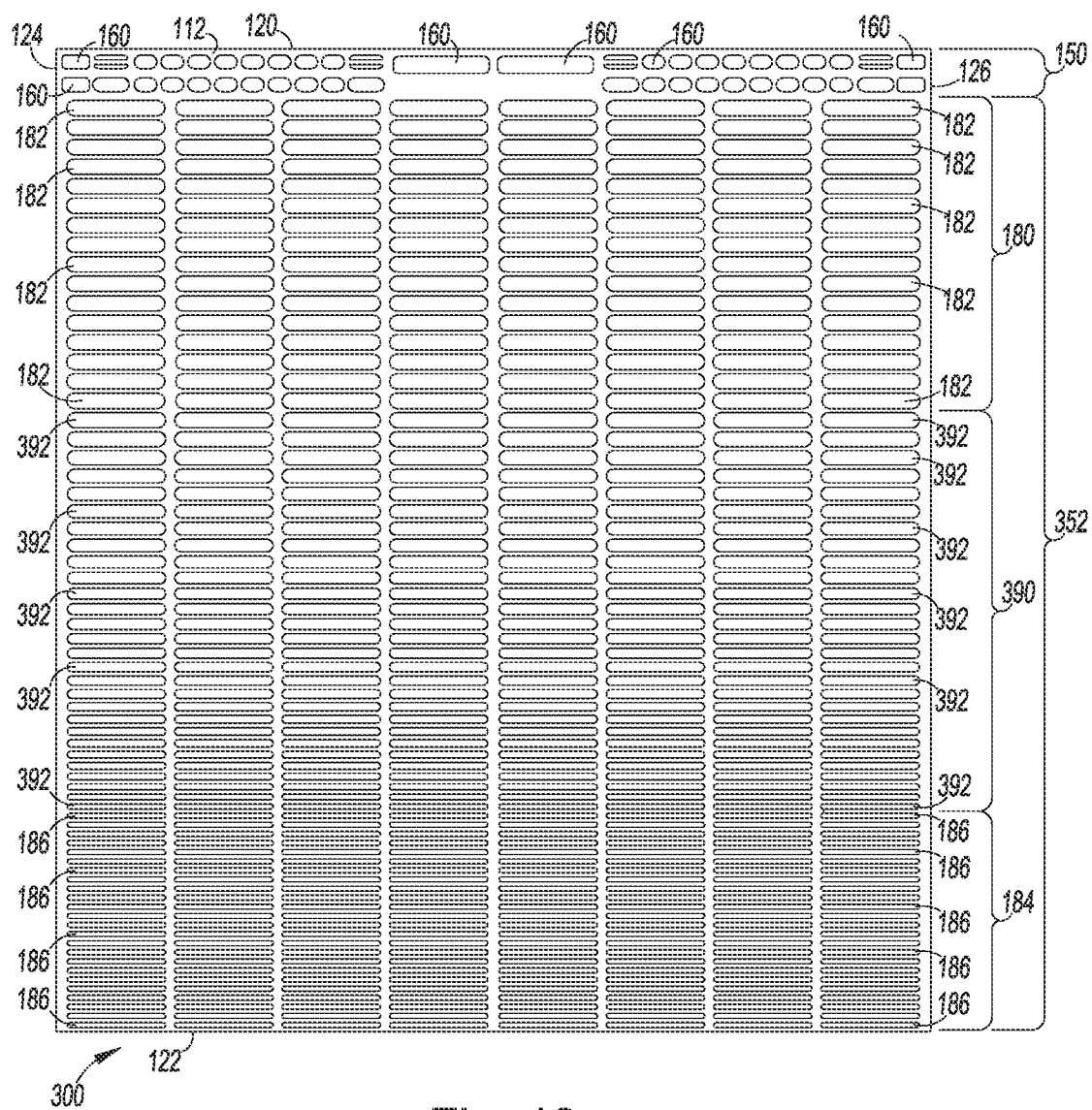
FIG. 13 illustrates a rear elevational view of a second embodiment of the mud flap wherein the mud flap of FIG. 13 is shorter (in the vertical direction) than the mud flap of FIG. 1.

The mud flap 100 of FIGS. 1-12 is readily adaptable to other sizes and configurations. FIG. 13 illustrates a rear view of a mud flap 300 in accordance with a second embodiment.

The mud flap 300 is similar to the mud flap 100 except that the vertical height is reduced to approximately 27 inches (approximately 686 millimeters). The mud flap 300 has the previously described rear surface 112, upper surface 120, lower surface 122, left surface 124 and right surface 126. The front surface 110 of the mud flap 300 is not shown in FIG. 13. The concave rear surface of the mud flap 300 is bowed outward by approximately 0.5 inch (approximately 12.7 millimeters) as in the embodiment of FIGS. 1-12; however, because of the shorter vertical dimension, the radius of the rear surface along a vertical midplane (not shown) corresponding to the vertical midplane 140 of FIG. 1 is approximately 183.6 inches (approximately 466 centimeters). Because the width has not changed, the radius in the horizontal midplane remains as previously described.

The mud flap 300 of FIG. 13 includes the upper mounting portion 150, which includes the plurality of mounting holes 160 as previously described. The lower extended portion 152 of the previously described embodiment is replaced with a modified lower extended portion 352. The modified lower extended portion includes at least two areas of slots as before. The upper slot area 180 comprises the first plurality of slots 182 (e.g., 128 slots) having the first (largest) size as previously described. The lower slot area 184 comprises the second plurality of slots 186 (e.g., 192 slots) having the second (smallest) size as previously described. In the illustrated embodiment, the modified lower extended portion includes a modified third (middle) slot area 390 comprising a third plurality of slots 392 having varying sizes between the first size and the second size. As discussed above, the slots in each of the three slot areas are organized in eight vertical columns as before.

In the mud flap 300 of FIG. 13, each slot 182 in the upper slot area 180 has the dimensions and the spacing described above for the corresponding slots of the embodiment of FIGS. 1-12. The upper slot area includes 16 rows of eight slots per row as previously described. The upper slot area has corresponding overall dimensions as the upper slot area of the embodiment of FIGS. 1-12 and has corresponding percentages of openings to solid material as previously described.

In the mud flap 300 of FIG. 13, each slot 186 in the lower slot area 184 has the dimensions and the spacing described above for the corresponding slots of the embodiment of FIGS. 1-12. The lower slot area includes 24 rows of eight slots per row as previously described. The lower slot area of FIG. 13 has corresponding overall dimensions as the lower slot area of the embodiment of FIGS. 1-12 and has corresponding percentages of openings to solid material as previously described In the mud flap 300 of FIG. 13, the modified middle slot area 390 comprises the third plurality of slots 392 and is positioned between the upper slot area 380 and the lower slot area 384 as before. The third plurality of slots also vary in height from a greatest height at the top of the middle slot area to a smallest height at the bottom of the middle slot area. Unlike the middle slot are 190 of FIGS. 1-12, the middle slot area 390 of FIG. 13 covers 3 inches less of vertical height. Thus, the transition from the uppermost slot having the greatest height to the lowermost slot having the smallest height occurs over a shorter distance. In the illustrated embodiment, the third plurality of slots have the following decreasing heights in 28 rows of slots: 0.411 inch; 0.401 inch; 0.391 inch; 0.381 inch; 0.372 inch; 0.362 inch; 0.352 inch; 0.342 inch; 0.332 inch; 0.322 inch; 0.312 inch; 0.303 inch; 0.293 inch; 0.283 inch; 0.273 inch; 0.263 inch; 0.253 inch; 0.243 inch; 0.234 inch; 0.224 inch; 0.214 inch;

0.204 inch; 0.194 inch; 0.184 inch; 0.174 inch; 0.165 inch; 0.155 inch; 0.145 inch. Accordingly, the middle slot area has a total of 35 rows of slots with slot heights varying from 0.411 inch to 0.145 inch. The heights of the slots in the uppermost row of the middle slot area are approximately 2.4 percent less than the heights of the slots in the upper slot area. The heights of the slots in the lowermost row of the middle slot area approximately 7.4 percent greater than the heights of the slots in the lower slot area.

FIG. 14 illustrates a rear view of a mud flap 400 in accordance with a third embodiment. The mud flap 400 is similar to the mud flap 100 and the mud flap 300 except that the vertical height of the mud flap 400 is further reduced to approximately 24 inches (approximately 610 millimeters). The mud flap 400 has the previously described rear surface 112, upper surface 120, lower surface 122, left surface 124 and right surface 126. The front surface 110 of the mud flap 400 is not shown in FIG. 14. The concave rear surface of the mud flap 400 is bowed outward by approximately 0.5 inch (approximately 12.7 millimeters) as in the embodiment of FIGS. 1-12; however, because of the shorter vertical dimension, the radius of the rear surface along a vertical midplane (not shown) corresponding to the vertical midplane 140 of FIG. 1 is approximately 144 inches (approximately 365 centimeters), which is approximately the same as the radius in the horizontal midplane because the vertical height is approximately the same as the horizontal width in the embodiment of FIG. 14.

The mud flap 400 of FIG. 14 includes the upper mounting portion 150, which includes the plurality of mounting holes 160 as previously described. The lower extended portion 152 of the previously described embodiment is replaced with a modified lower extended portion 452. The modified lower extended portion includes at least two areas of slots as before. The upper slot area 180 comprises the first plurality of slots 182 having the first (largest) size as previously described. The lower slot area 184 comprises the second plurality of slots 186 having the second (smallest) size as previously described. In the illustrated embodiment, the lower extended portion includes a modified third (middle) slot area 490 comprising a third plurality of slots 492 having varying sizes between the first size and the second size. As discussed above, the slots in each of the three slot areas are organized in eight vertical columns as before.

In the mud flap 400 of FIG. 14, each slot 182 in the upper slot area 280 has the dimensions and the spacing described above for the corresponding slots of the embodiment of FIGS. 1-12. The upper slot area includes 16 rows of eight slots per row as previously described. The upper slot area has corresponding overall dimensions as the upper slot area of the embodiment of FIGS. 1-12 and has corresponding percentages of openings to solid material as previously described.

In the mud flap 400 of FIG. 14, each slot 186 in the lower slot area 184 has the dimensions and the spacing described above for the corresponding slots of the embodiment of FIGS. 1-12. The lower slot area includes 24 rows of eight slots per row as previously described. The lower slot area of FIG. 14 has corresponding overall dimensions as the lower slot area of the embodiment of FIGS. 1-12 and has corresponding percentages of openings to solid material as previously described.

In the mud flap 400 of FIG. 14, the modified middle slot area 490 comprises the third plurality of slots 492 and is positioned between the upper slot area 480 and the lower slot area 484 as before. The third plurality of slots also vary in height from a greatest height at the top of the middle slot area to a smallest height at the bottom of the middle slot area. Unlike the middle slot area 190 of FIGS. 1-12, the vertical height of the middle slot area 490 of FIG. 14 is 6 inches less vertical height of the middle slot area 190 of FIGS. 1-12. Thus, the transition from the uppermost slot having the greatest height to the lowermost slot having the smallest height occurs over a shorter distance. In the illustrated embodiment, the third plurality of slots having the following dimensions in 20 rows of slots: 0.421 inch; 0.407 inch; 0.392 inch; 0.378 inch; 0.363 inch; 0.349 inch; 0.335 inch; 0.321 inch; 0.307 inch; 0.292 inch; 0.278 inch; 0.264 inch; 0.249 inch; 0.235 inch; 0.221 inch; 0.206 inch; 0.192 inch; 0.178 inch; 0.164 inch; 0.149 inch. Accordingly, the middle slot area has a total of 20 rows of slots with slot heights varying from 0.421 inch to 0.149 inch. To provide equal spacing of the horizontal vanes 172 between rows of slots, the slots in the top row of the middle slot area have the same height as the slots 182 in the upper slot area 180. The heights of the slots in the uppermost row of the middle slot area are approximately the same as the heights of the slots in the upper slot area. The heights of the slots in the lowermost row of the middle slot area are approximately 10.4 percent greater than the heights of the slots in the lower slot area.

The mud flap 100, the mud flap 300 and the mud flap 400 may have the respective mounting portions 150 proximate to the respective upper surfaces 120. The three mud flaps are intended to be installed onto a conventional straight mounting bracket. The plurality of elongate mounting holes 160 enable the mud flaps to be positioned onto brackets with various threaded mounting bores using screws or bolts.

Figure 15:
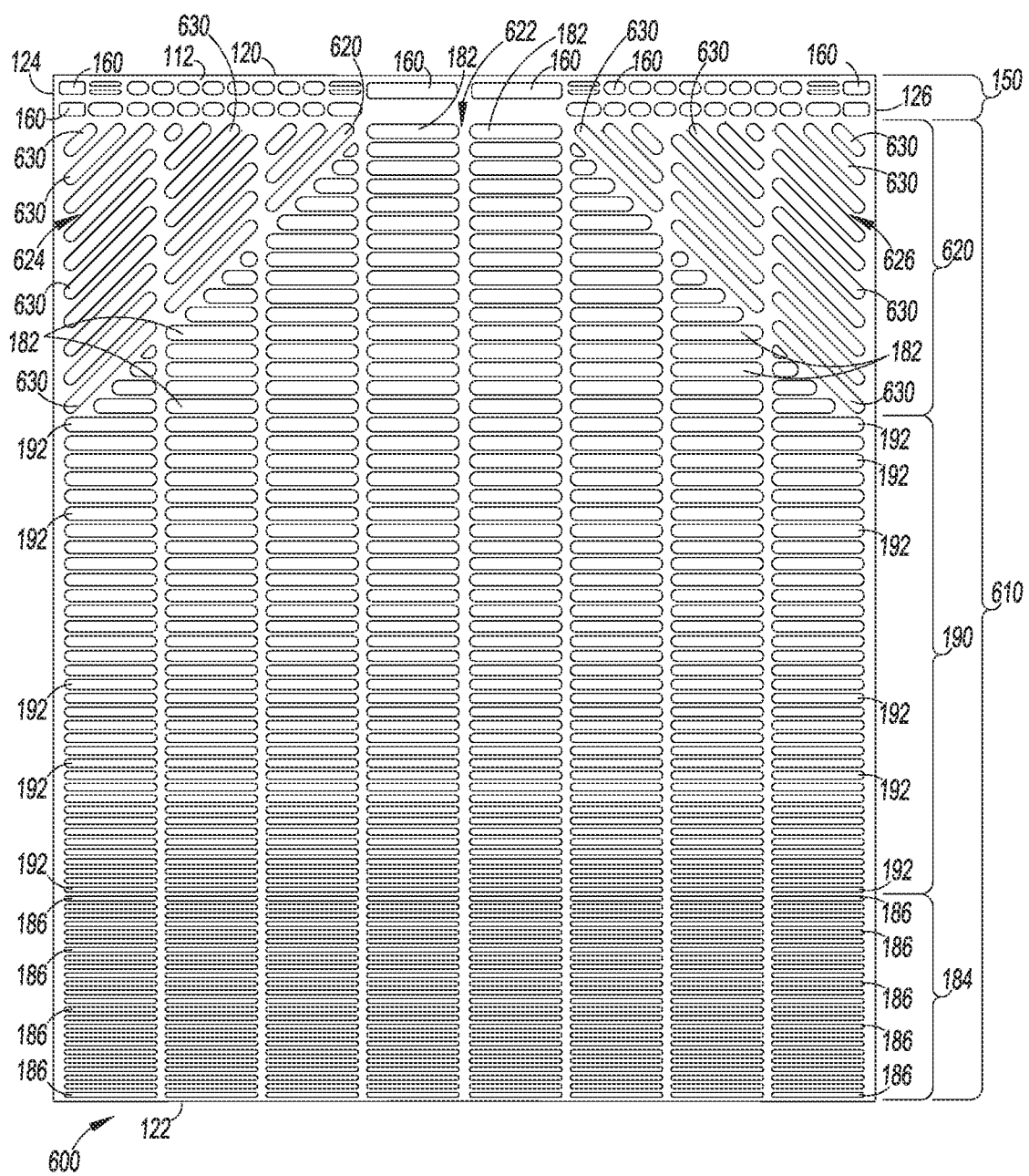
FIG. 15 illustrates a rear elevational view of a fourth embodiment of the mud flap, which is modified from the mud flap of FIG. 1, wherein the mud flap of FIG. 15 further includes a first (left) area of diagonal mounting openings and a second (right) area of diagonal mounting structures.
Figure 16:
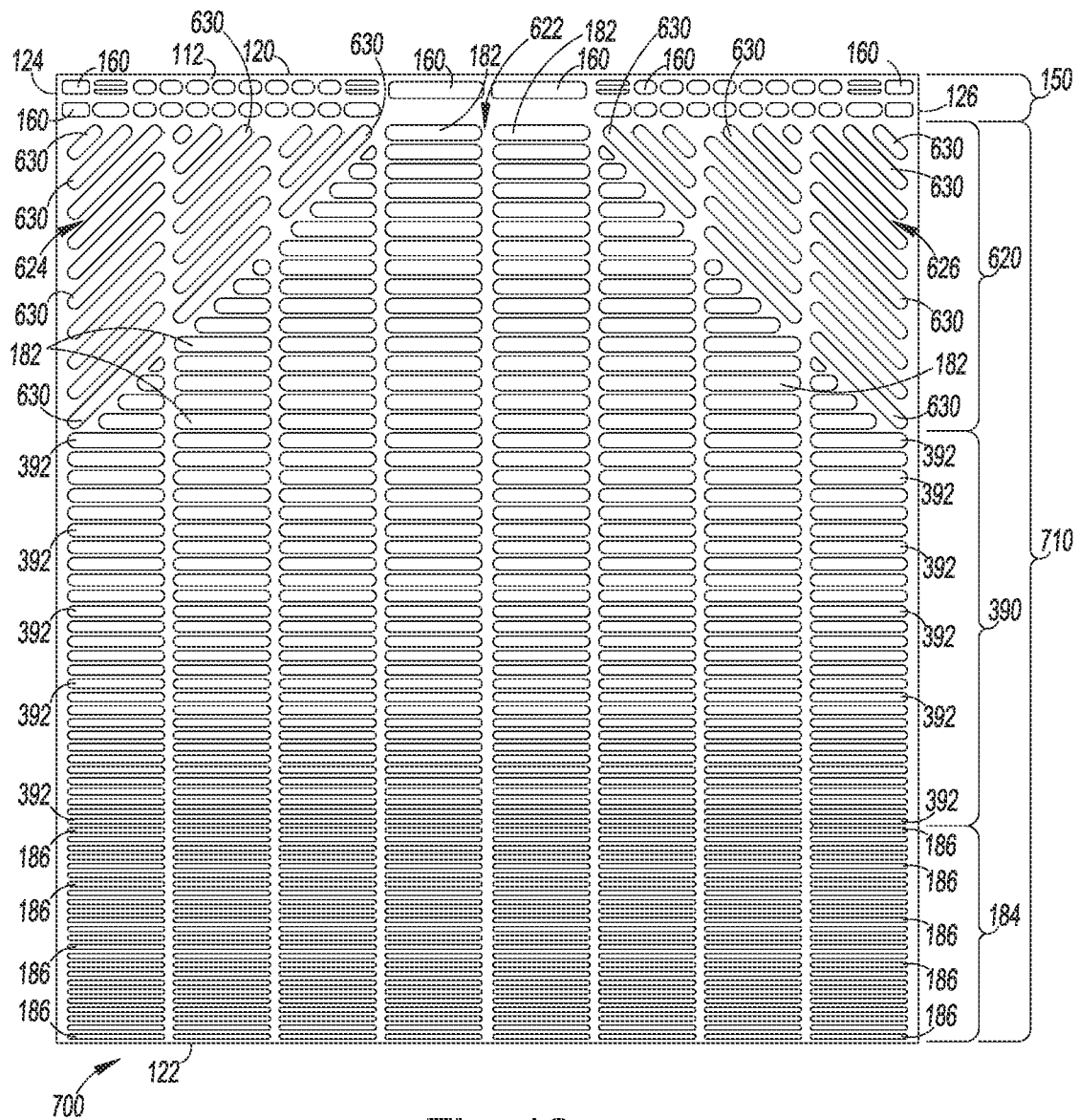
FIG. 16 illustrates a rear elevational view of a fifth embodiment of the mud flap, which is modified from the mud flap of FIG. 13, wherein the mud flap of FIG. 16 further includes a first (left) area of diagonal mounting openings and a second (right) area of diagonal mounting structures.

Certain vehicles have mounting brackets having a different configuration. For example, FIG. 18 illustrates a "doglegged" mounting bracket 500 that includes a first straight (horizontal) section 502 and a second inclined section 504. The horizontal section includes a first plurality of elongated mounting bores 510. The angled portion includes a second plurality of angled elongated bores 512. When a mud flap is positioned against the mounting bracket, bolts (not shown) pass through the mud flap and the mounting bracket. A nut on each bolt may be tightened to secure the mud flap to the mounting bracket. The mounting holes on the inclined section of the doglegged mounting bracket do not match the mounting holes 160 of the mud flaps 100, 300, 400 described above. FIGS. 15, 16 and 17 illustrate further embodiments of the previously described mud flaps that are adapted to be mounted on doglegged mounting brackets.

FIG. 15 illustrates a 24-inch by 30-inch mud flap 600 similar to the mud flap 100 of FIGS. 1-12. The mud flap includes the upper mounting portion 150 as previously described; however, the lower extended portion is replaced with a modified lower extended portion 610. The lower slot area 184 and the middle slot area 190 within the lower extended portion are configured as described in FIGS. 1-12; however, the upper slot area 180 of the mud flap 100 is replaced with a modified upper slot area 620 having a central trapezoidal portion 622, a left triangular portion 624 and a right triangular portion 626. The central trapezoidal portion comprises sixteen rows of constant-sized slots 182 as previously described; however, the rows of slots in the central trapezoidal portion do not extend across eight columns as before. Instead, the first row of slots extends across only the middle two columns. Each of the second through sixth rows has a partial horizontal slot at each end of each row. The partial horizontal slots increase in width with each subsequently lower row. The seventh row of slots extends across four columns. Each of the eighth through eleventh rows has a partial horizontal slot at each end of each row. The partial horizontal slots increase in width with each subsequently lower row. The twelfth row of slots extends across six columns. Each of the thirteenth through sixteenth rows has a partial horizontal slot at each end of each row. The partial horizontal slots increase in width with each subsequently lower row.

As further shown in FIG. 15, the left triangular portion 624 has the appearance of an inverted triangle having a base that corresponds to the approximate width of three slot columns wide and having a height that corresponds to the approximate height of sixteen horizontal rows of slots. The material within the left triangular portion includes a plurality of elongate openings 630 that are oriented at an angle of approximately 45 degrees with respect to the left surface 124 of the mud flap 600. Each of the largest slots has width (longest dimension) of approximately 3.66 inches and a height of approximately 0.375 inch perpendicular to the long dimension. Accordingly, the heights of the slots are configured to accommodate a conventional ⅜-inch mounting bolt. The slots are spaced apart in a direction perpendicular to the sides of the slots by approximately 0.215 inch. The slots nearer the upper base of the left triangular portion are truncated as shown. The elongated slots in the left triangular portion allow air, water and small debris to flow through as described above. The slots may also be used to mount the mud flap onto a doglegged bracket as described below.

The right triangular portion 616 is the mirror image of the left triangular portion 614 and comprises a corresponding plurality of openings (slots) 630 having the dimensions and spacing described above.

FIG. 16 illustrates a mud flap 700 based in part on the mud flap 300 of FIG. 13. In the embodiment of FIG. 16, the lower extended portion 352 is replaced with a modified lower extended portion 710. The modified lower extended portion of FIG. 16 includes the lower slot area 184 with slots 186 of the embodiment of the mud flap of FIG. 13 and includes the middle slot area 390 with the slots 392 of FIG. 13. Unlike, the embodiment of FIG. 13, the embodiment of FIG. 16 includes the modified upper slot area 620 of FIG. 15, which includes the central trapezoidal portion 622, the left triangular portion 624 and the right triangular portion 626 as described in FIG. 15.

FIG. 17 illustrates a mud flap 800 based in part on the mud flap 400 of FIG. 14. In the embodiment of FIG. 17, the lower extended portion 352 is replaced with a modified lower extended portion 810. The modified lower extended portion includes the lower slot area 184 with slots 186 of the embodiment of the mud flap of FIG. 14 and includes the middle slot area 490 with the slots 492 of FIG. 14. Unlike, the embodiment of FIG. 14, the embodiment of FIG. 17 include the modified upper slot area 620 of FIG. 15, which includes the central trapezoidal portion 622, the left triangular portion 624 and the right triangular portion 626 as described in FIG. 15.

The mud flaps 600, 700 and 800 of FIGS. 15, 16 and 17 are mounted onto the doglegged mounting bracket 500 of FIG. 18 by removing all or a portion of either the left triangular portion 624 or the right triangular portion 626 of the respective mud flap. For example, FIG. 18 illustrates the mud flap 800 of FIG. 17 with part of the left triangular portion cut away at a 45-degree angle parallel to the elongated slots 630 in the left triangular portion. The cut line through the left triangular portion is extended through the upper mounting portion 150 at the same angle. The trimmed mud flap is then positioned on the mounting bracket with selected slots aligned with the threaded bores of the mounting bracket as shown in FIG. 18. A plurality of nuts and/or bolts (not shown) or any other fixing or coupling member may be used to secure the mud flap to the mounting bracket. When installed on the doglegged bracket, the elongated openings in the right triangular portion and any remaining exposed elongated openings in the left triangular portion allow air, water and small debris to flow through the upper portion of the mud flap as described above. Air, water and small debris continue to flow through the slots 182 in the central trapezoidal portion 622

As various changes could be made in the above constructions without departing from the scope of the invention, it is intended that all the matter contained in the above description or shown in the accompanying drawings shall be interpreted as illustrative and not in a limiting sense.

What is claimed is:

1. A mud flap configured to be installed behind a wheel of a wheeled vehicle, the mud flap comprising:
    a flexible material having a front surface, a rear surface, an upper surface, and a lower surface, the rear surface spaced apart from the front surface by a thickness of the flexible material, the upper surface spaced apart from the lower surface by a height of the flexible material;
    a first set of air flow openings formed through the flexible material from the front surface to the rear surface, the first set of air flow openings arranged in vertical columns and arranged in a first plurality of horizontal rows, each opening in the first set of air flow openings having a first vertical height, the first set of air flow openings located in an upper air flow band; and
    a second set of air flow openings formed through the flexible material from the front surface to the rear surface, the second set of air flow openings arranged in the vertical columns and arranged in a second plurality of rows, each opening in the second set of air flow openings having a second vertical height, the second vertical height less than the first vertical height, the second set of air flow openings located in a lower air flow band immediately above the lower surface.

2. The mud flap as defined in claim 1, further comprising a plurality of mounting openings formed through the flexible material from the front surface to the rear surface, the plurality of mounting openings located in a mounting band proximate to the upper surface.

3. The mud flap as defined in claim 1, wherein at least a portion of the upper air flow band includes a diagonal mounting area with mounting openings oriented at approximately 45 degrees to the upper surface of the mud flap.

4. The mud flap as defined in claim 1, wherein a least a portion of the flexible material is a concave portion.

5. The mud flap as defined in claim 4, wherein the concave portion is located on the front surface of the flexible material.

6. The mud flap as defined in claim 1, wherein at least a portion of the flexible material is a convex portion.

7. The mud flap as defined in claim 6, wherein the convex portion is located on the rear surface of the flexible material.

8. The mud flap as defined in claim 1, wherein at least a portion of the flexible material comprises a nylon material.

9. The mud flap as defined in claim 1, wherein the thickness of the flexible material is 0.25 inch.

10. The mud flap as defined in claim 1, further comprising a trimmable portion configured to correspond to at least a portion of a mounting bracket to which the mud flap is mountable.

11. A mud flap configured to be installed behind a wheel of a wheeled vehicle, the mud flap comprising:

a flexible material having a front surface, a rear surface, an upper surface, and a lower surface, the rear surface spaced apart from the front surface by a thickness of the flexible material, the upper surface spaced apart from the lower surface by a height of the flexible material;

a first set of air flow openings formed through the flexible material from the front surface to the rear surface, the first set of air flow openings arranged in vertical columns and arranged in a first plurality of horizontal rows, each opening in the first set of air flow openings having a first vertical height, the first set of air flow openings located in an upper air flow band;

a second set of air flow openings formed through the flexible material from the front surface to the rear surface, the second set of air flow openings arranged in the vertical columns and arranged in a second plurality of rows, each opening in the second set of air flow openings having a second vertical height, the second vertical height less than the first vertical height, the second set of air flow openings located in a lower air flow band immediately above the lower surface; and a third set of air flow openings formed through the flexible material from the front surface to the rear surface, the third set of air flow openings arranged in the vertical columns in a third plurality of rows, the third set of air flow openings located between the first set of openings and the second set of openings, the openings in the third set of openings having varying heights, such that each opening in an uppermost row of the third plurality of rows has a greatest third set height, such that each opening in a lowermost row of the third plurality of rows has a least third set height and such that each opening in at least one row of the third plurality of rows between the uppermost row and the lowermost row has a height between the greatest third set height and the least third set height.

12. The mud flap as defined in claim 11, further comprising a plurality of mounting openings formed through the flexible material from the front surface to the rear surface, the plurality of mounting openings located in a mounting band proximate to the upper surface.

13. The mud flap as defined in claim 11, wherein at least a portion of the upper air flow band includes a diagonal mounting area with mounting openings oriented at approximately 45 degrees to the upper surface of the mud flap.

14. The mud flap as defined in claim 11, wherein a least a portion of the flexible material is a concave portion.

15. The mud flap as defined in claim 14, wherein the concave portion is located on the front surface of the flexible material.

16. The mud flap as defined in claim 11, wherein at least a portion of the flexible material is a convex portion.

17. The mud flap as defined in claim 16, wherein the convex portion is located on the rear surface of the flexible material.

18. The mud flap as defined in claim 11, wherein at least a portion of the flexible material comprises a nylon material.

19. The mud flap as defined in claim 11, wherein the thickness of the flexible material is 0.25 inch.

20. The mud flap as defined in claim 11, further comprising a trimmable portion configured to correspond to at least a portion of a mounting bracket to which the mud flap is mountable.

* * * * *